United States Patent [19]

Kitamura

[11] 4,303,944

[45] Dec. 1, 1981

[54] TELEVISION RECEIVER COMPATIBLE WITH BOTH AMERICAN AND EUROPEAN SYSTEMS

[75] Inventor: Tsutomu Kitamura, Tokyo, Japan

[73] Assignee: Matsushita Electric Industrial Co., Ltd., Osaka, Japan

[21] Appl. No.: 163,211

[22] Filed: Jun. 25, 1980

[30] Foreign Application Priority Data

Jul. 2, 1979 [JP] Japan ............................ 54-83630

[51] Int. Cl.³ .......................... H04N 5/48; H04B 1/16
[52] U.S. Cl. .................................. 358/191.1; 455/180
[58] Field of Search ................. 358/191.1; 455/180; 334/11, 15, 16

*Primary Examiner*—John C. Martin
*Attorney, Agent, or Firm*—Burgess, Ryan and Wayne

[57] ABSTRACT

A television receiver compatible with both American and European systems in which, in the case of switching from the American system mode to the European system mode, the voltage at the center tap of a variable resistor, through which is supplied a tuning voltage, is caused to drop to a lower level so that the tuning voltages for the reception of European system high- and low-band VHF television channels can be obtained.

3 Claims, 7 Drawing Figures

TELEVISION RECEIVER COMPATIBLE WITH BOTH AMERICAN AND EUROPEAN SYSTEMS

BACKGROUND OF THE INVENTION

The present invention relates to generally a television receiver capable of receiving both the American and European system television channels and more particularly a radio frequency section thereof.

At present various television systems are used which are different in sound intermediate frequency, television channels, the field frequency and so on. For instance, television systems used in U.S.A. and European countries such as Germany are different as shown in TABLE 1 below.

TABLE 1

|  | U.S.A. | European |
| --- | --- | --- |
| Low-band VHF range | 54–88 MHz | 47–68 MHz |
| High-band VHF range | 174–216 MHz | 174–230 MHz |
| UHF range | 470–890 MHz | 470–862 MHz |
| Sound intermediate frequency | 4.5 MHz | 5.5 MHz |
| Field frequency | 60 Hz | 50 Hz |

In order to receive such various television channels, a television set adapted for a particular television system must be provided. Alternatively, a television receiver must be provided with a switching means for tuning in a particular television system. Especially in the case of the small-sized, battery-operated portable television sets which must be operated with any television system in the world, they must be provided with such switching means as described above.

OBJECTS OF THE INVENTION

In view of the above, the primary object of the present invention is to provide a television receiver compatible with various television systems in the world which can substantially overcome various problems encountered in the prior art television receivers.

According to the present invention, the tuning voltages for tuning in various television systems such as U.S.A. and European system VHF television channels can be obtained by operating a switch which in turn is ganged with other switches required for selecting a particular television system such as U.S.A. or European system.

BRIEF DESCRIPTION OF THE DRAWINGS

Same reference numerals are used to designate similar parts throughout the figures.

DETAILED DESCRIPTION OF THE PRIOR ART

Figure 1:
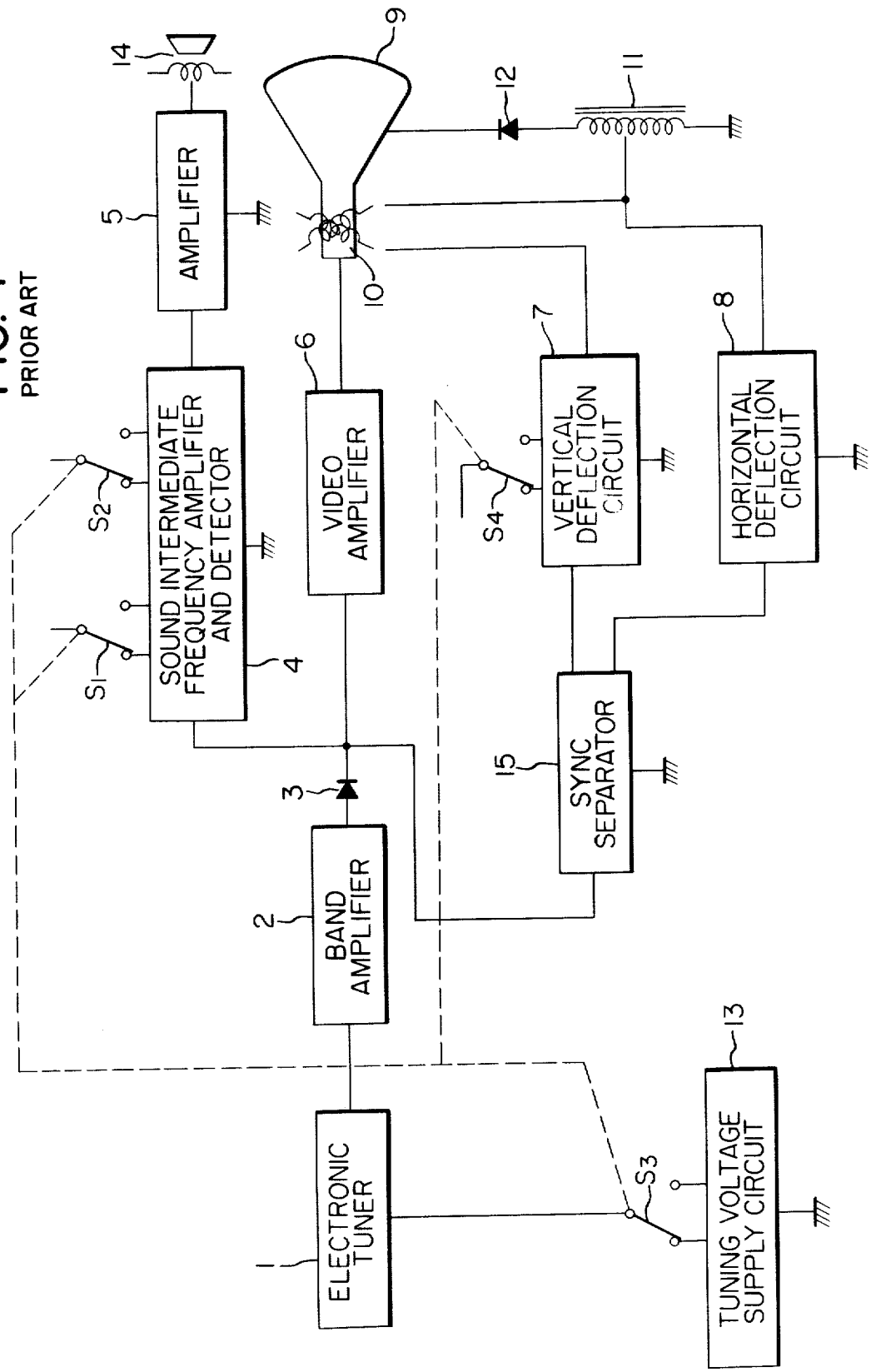
FIG. 1 is a block diagram of a television receiver capable of receiving both the American and European system VHF television channels.

In FIG. 1 is shown the circuit diagram of a prior art television set. The tuned signal derived from an electronic tuner 1 is amplified by a band amplifier 2 and then demodulated by a video detector 3. The demodulated signal is further demodulated into the sound signal by a sound intermediate frequency amplifier and detector 4 and amplified by an amplifier 5 so as to drive a speaker 14. The signal from the video detector 3 is applied not only to a video amplifier 6 but also to a sync separator 15. The sync signals derived from the sync separator 15 are applied to both the vertical and horizontal deflection circuits 7 and 8 which in turn apply the vertical and horizontal deflection signals to deflection coil 10, respectively, so as to steer the electron beam in a cathode-ray tube 9. The tuning voltage is supplied from a tuning voltage supply circuit 13 to the electronic tuner 1.

The television set is provided with four switches $S_1$ through $S_4$ in order to receive either the American or European system television signals. The first and second switches $S_1$ and $S_2$ are switched in order to select a resonant frequency depending upon a corresponding sound intermediate frequency; the third switch $S_3$ is switched so as to select a television channel; and the fourth switch $S_4$ is switched so that a predetermined amplitude is maintained irrespective of the field frequency. These switches $S_1$ through $S_4$ are so ganged that they can be operated simultaneously.

Figure 2:
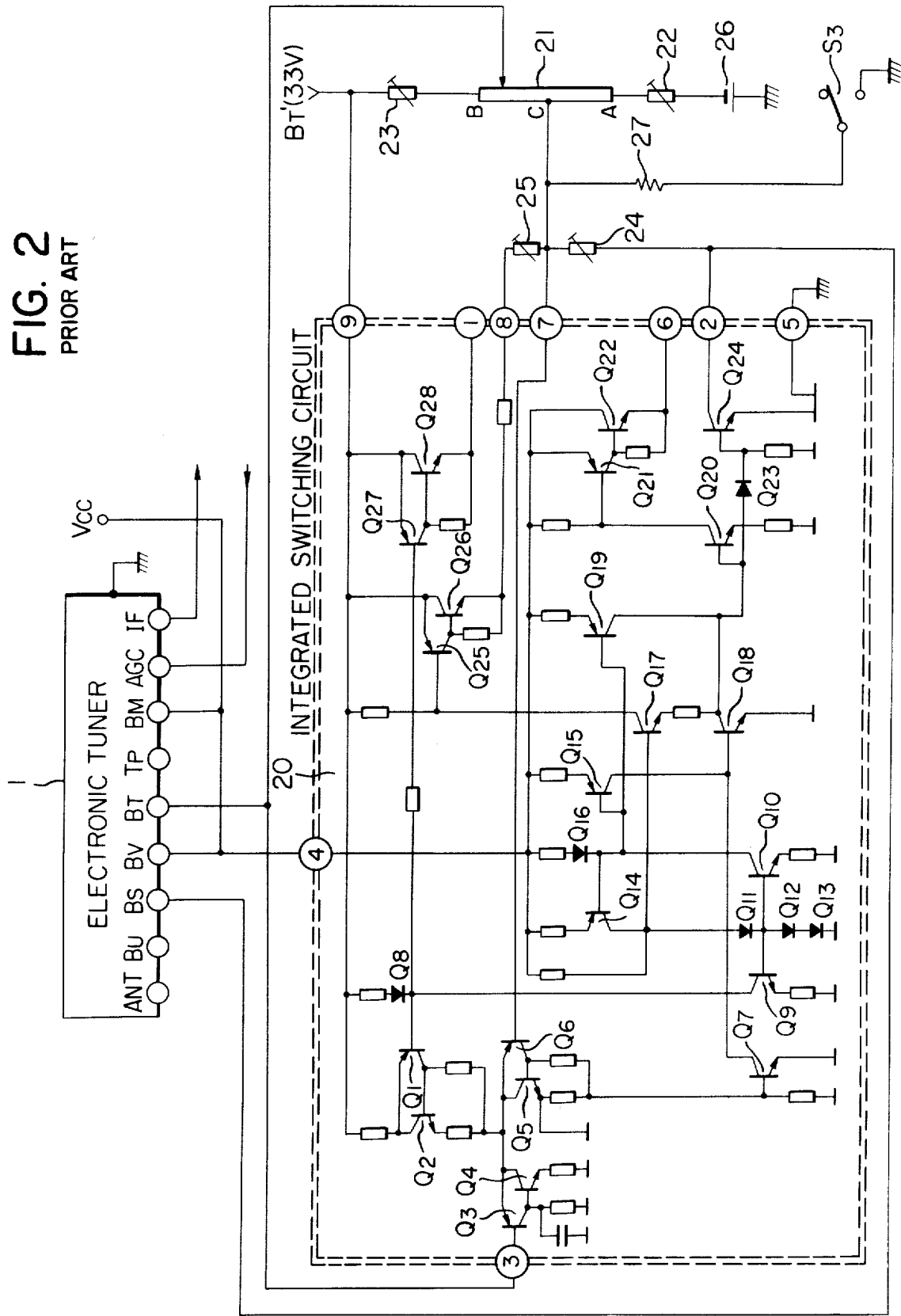
FIG. 2 is a diagram of an electronic tuner and its associated circuits in the television receiver shown in FIG. 1.

In FIG. 2 is shown in detail the tuning voltage supply circuit 13 including the third switch $S_3$ which is set for the reception of the VHF television channels. The circuit includes an integrated switching circuit 20 for selecting either the high-band or low-band VHF television channels, a variable resistor 21, variable resistors 22, 23, 24 and 25 for fine adjustment of the tuning voltage, and voltage supplies $B_{T'}$ and 26. The output from the switching circuit 20 varies depending upon whether the movable arm of the variable resistor 21 is positioned between the terminal A and the center tap C or between the center tap C and the terminal B. More specifically, the output changes depending upon whether the voltage impressed at the terminal or pin (3) is higher or lower than the voltage applied to the pin (7).

As described elsewhere, the sliding arm of the variable resistor 21 is located between the terminal A and the center tap C in the case of the reception of the low-band VHF television channels while in the case of the reception of the high-band VHF television channels, it is located between the center tap C and the terminal B. For instance, when the sliding arm is positioned between the terminal A and the center tap C, the voltage impressed at the pin (7) is greater than that applied to the pin (3). That is, $V_7 > V_3$. As a result, of the transistors $Q_3$, $Q_4$, $Q_5$ and $Q_6$, which constitute comparator, the transistors $Q_3$ and $Q_4$ are enabled so that a transistor $Q_{18}$ is enabled while transistors $Q_7$ and $Q_{24}$ are disabled. As a consequence, the voltage at the pin (2) rises to a high level. Since the transistor $Q_{18}$ is turned on, transistors $Q_{20}$, $Q_{21}$ and $Q_{22}$ are turned off so that the voltage at the pin (6) drops to a low level. Furthermore, since the transistor $Q_{18}$ is turned on, transistors $Q_{17}$, $Q_{25}$ and $Q_{26}$ are also turned on so that the voltage at the pin (8) rises to a high level.

When the sliding arm of the variable resistor 21 is between the center tap C and the terminal B, the conditions are reversed; that is, the voltages at the pins (2)

and (8) drop to a low level while the voltage at the pin (6) rises to a high level.

The outputs from the switching circuit 20 are shown in the truth value table or TABLE 2 below, in which "VHF LOW" corresponds when the sliding arm of the variable resistor 21 is between the terminal A and the center tap C while "VHF HIGH", when the sliding arm is between the terminal B and the center tap C.

TABLE 2

|  | pin (1) | pin (2) | pin (6) | pin (8) |
|---|---|---|---|---|
| VHF LOW | H | H | L | H |
|  | ON | OFF | OFF | ON |
| VHF HIGH | H | L | H | L |
|  | ON | ON | ON | OFF |

In TABLE 3 are shown the voltages $B_S$ and $B_T$ required for the reception of the low-band and high-band VHF television channels in American and European systems.

TABLE 3

|  |  | $B_S$ | $B_T$ |
|---|---|---|---|
| VHF LOW | American | H | 5–20 V |
|  | European | H | 2–9 V |
| VHF HIGH | American | L | 10–16 V |
|  | European | L | 10–20 V |

From TABLE 3, it is seen that in order to receive either American or European system low-band and high-band VHF television channels, the tuning voltage $B_T$ must be varied:

from 2 to 20 V for low-band VHF channels, and
from 10 to 20 V for high-band VHF channels.

Therefore, the "variation ratio" becomes:
20/2 = 10 times for low-band VHF channels, and
20/10 = 2 times for high-band VHF channels.

Since the "variation ratio" for low-band VHF channels is so high, the required voltages cannot be supplied through the variable resistor 21 in which the sliding arm is between the terminal A and the center tap C for the reception of low-band VHF channels.

Figure 3A:
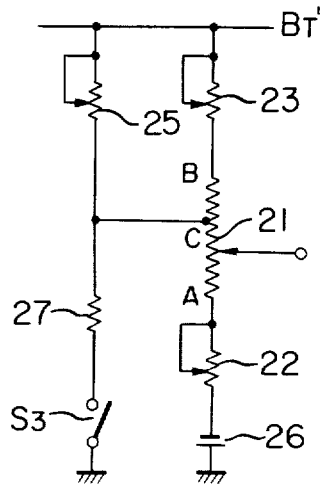
FIG. 3A shows the state or mode for the reception of the low-band VHF television channels.
Figure 3B:
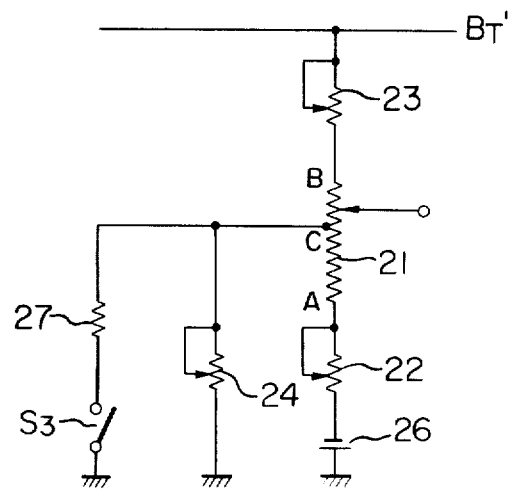
FIG. 3B shows the state or mode for the reception of the high-band VHF television channels.

In order to solve this problem, the prior art television set is provided with the third switch $S_3$ as shown in FIGS. 2, 3A and 3B. FIG. 3A shows the state of the third switch $S_3$ for the reception of the low-band VHF channels. In the case of the reception of the American system low-band VHF television channels, the switch $S_3$ is opened so that the variable resistor 21 can vary the tuning voltage from 5 to 20 V (the variation ratio being 20/5 = 4), with the sliding arm moving between the terminal A and the center tap C. In the case of the reception of European system low-band VHF channels, the switch $S_3$ is closed so that a resistor 27 is inserted in the circuit shown, thereby dropping the potential at the center tap C of the variable resistor 21 to the order of 10 V, the value of the resistor 27 being selected so as to cause such voltage drop. Since the tuning voltage $B_T$ which is required for reception is from 2 to 9 V, both American and European system low-band VHF television channels can be received.

FIG. 3B shows the state for the reception of high-band VHF television channels. The third switch $S_3$ must be closed for the reception of European system high-band VHF channels so that the resistor 27 is inserted in parallel with the variable resistor 24 and consequently the potential at the center tap C drops. However, as shown in TABLE 3, for the reception of high-band VHF television channels in European system, the tuning voltage $B_T$ higher than that in the American system is needed. It follows, therefore, that the voltage drop at the center tap C is not preferable.

In order to solve this problem, there has been proposed to separate the third switch $S_3$ from the other switches $S_1$, $S_2$ and $S_4$ which are ganged, but, in practice, such arrangement would complicate the channel selection.

DESCRIPTION OF THE PREFERRED EMBODIMENT

Figure 5A:
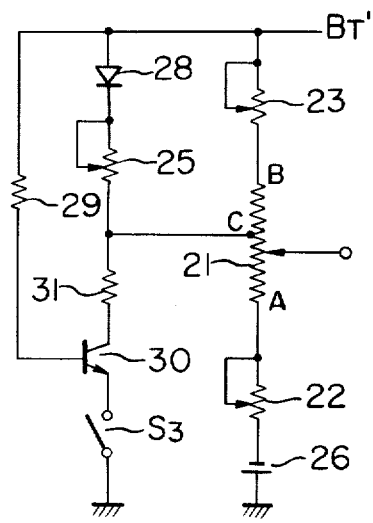
FIG. 5A shows the state or mode for the reception of the low-band VHF television channels.
Figure 5B:
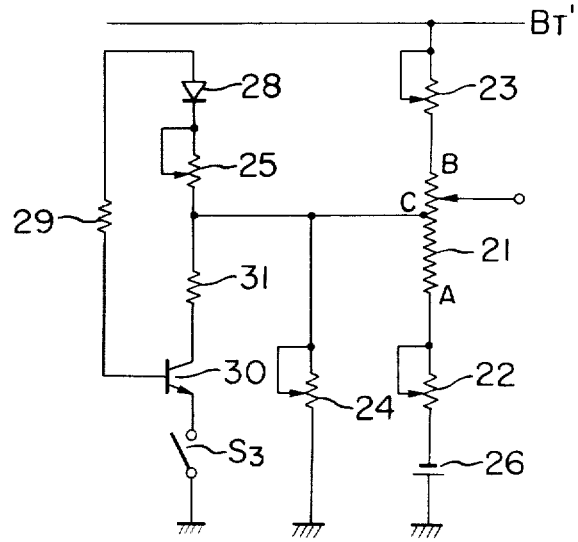
FIG. 5B shows the state or mode for the reception of the high-band VHF television channels.
Figure 4:
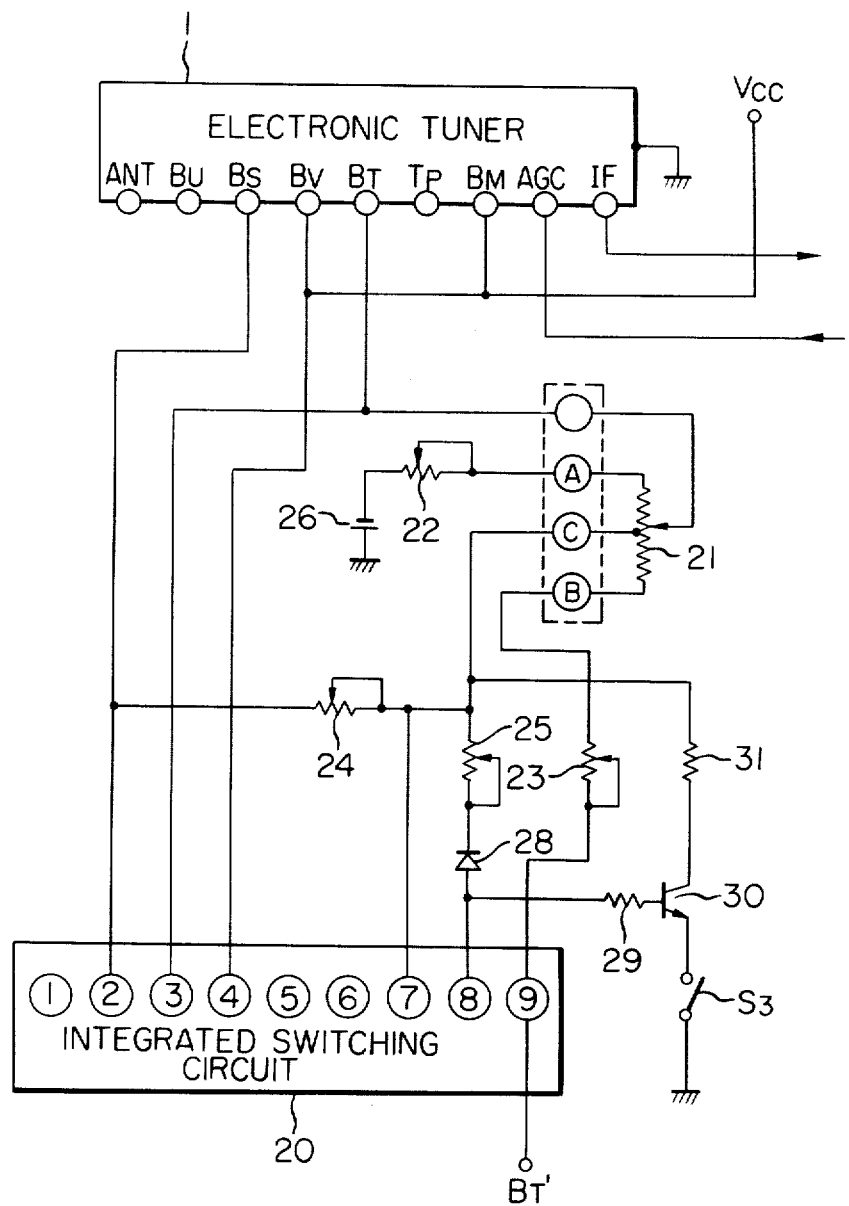
FIG. 4 is a circuit diagram used for the explanation of the present invention.

A preferred embodiment of the present invention which can substantially solve the above and other problems will be described in detail with reference to FIGS. 4, 5A and 5B. In FIG. 4, the detailed construction of the switching circuit 20 is not shown except the pins (1) through (9) for the sake of easy understanding of the present invention. The anode of a diode 28 is connected to the pin (8) of the switching circuit 20 which rises to a high voltage level in the case of the reception of low-band VHF channels while the cathode is connected to the variable resistor 25. The base of a transistor 30 is connected through a resistor 29 to the anode of the diode 28 and to the pin (8); the collector is connected through a resistor 31 to the center tap C of the variable resistor 21; and the emitter is connected to ground through the switch $S_3$. Other arrangements are similar to those described in conjunction with FIG. 2.

The reception of low-band VHF television channels will be first described with reference to FIG. 5A. The voltage at the pin (8) rises to a high level so that one end of the resistor 29 and the anode of the diode 28 are connected to the $B_T'$ line. As a result, the current flows to the base of the transistor 30 through the resistor 29. For the reception of the European system low-band VHF television channels, the switch $S_3$ is closed. Then the transistor 30 is turned on so that the current flows through the resistor 31 and consequently the voltage at the center tap C drops.

For the reception of the American system low-band VHF television channels, the switch $S_3$ is opened so that the transistor 30 is turned off and consequently the voltage at the center tap C rises.

The mode of reception of high-band VHF television channels will be described in conjunction with FIG. 5B. The voltage at the pin (8) of the switching circuit 20 remains at a low level so that both the base of the transistor 30 and the anode of the diode 28 are disconnected from the $B_T'$ line are interconnected to each other through the resistor 29. For the reception of the European system high-band VHF channels, the switch $S_3$ is closed. Then, the diode 28 inserted into the base circuit of the transistor 30 prevents the flow of current into the base. As a consequence, the transistor 30 remains turned off so that no voltage drop will occur at the center tap C. These conditions are same as those when the switch $S_3$ is opened for the reception of the American system high-band VHF television channels. Thus the European system high-band VHF channels can be received.

In summary, according to the present invention, even when the switch $S_3$ is closed for the reception of the European system high-band VHF television channels, the voltage drop at the center tap of the variable resistor 21 will not result so that a desired tuning voltage can be obtained.

What is claimed is:

1. A television receiver compatible with both American and European systems characterized by comprising
   (a) an electronic tuner,
   (b) a variable resistor for supplying a tuning voltage to said electronic tuner, the movable slider of said variable resistor being connected to a tuning voltage input terminal of said electronic tuner, said variable resistor having a center tap,
   (c) a switch for selecting a relatively wide low-band in the VHF range or a relatively narrow high-band in the VHF range, and
   (d) a means which, when said switch is closed for the reception of the low-band VHF television channels, is turned on and connects a resistor to said center tap of said variable resistor, thereby dropping the voltage at said center tap and which, when said switch is opened, is turned off and disconnects said resistor from said center tap of said variable resistor, in the case of the reception of the high-band VHF television channels, said means keeping said resistor disconnected from said center tap of said variable resistor regardless of said switch being opened or closed.

2. A television receiver as set forth in claim 1 further characterized in that
   said center tap of said variable resistor is connected to the cathode of a diode whose anode is connected to a terminal or pin at which the voltage rises to a high level in the case of the reception of the low-band VHF television channels but falls to a low level in the case of the reception of the high-band VHF television channels,
   a switching element is provided, which is turned on or off depending upon a high or low level of the voltage at said terminal or pin,
   said switch is interconnected in series between one end of said switching element and a reference voltage, and the other end of said switching element is connected to said center tap of said variable resistor through a resistor.

3. A television receiver as set forth in claim 1 further characterized in that
   a switching circuit is provided which causes said electronic tuner to tune in a desired television channel,
   whose output varies depending upon the result of the comparison between the voltage at said center tap of said variable resistor and the tuning voltage obtained at said movable slider thereof, and
   which has a terminal at which the voltage rises to a high level in the case of the reception of low-band VHF television channels but falls to a low level in the case of the reception of high-band VHF channels, said terminal being connected to the anode of a diode and the base of a transistor which constitutes a switching element.

* * * * *